United States Patent Office
3,686,271
Patented Aug. 22, 1972

3,686,271
NOVEL NORMOLIPEMIANT AGENTS
Louis Lefon, Paris, France, assignor to Société anonyme dite, Orsymonde, Paris, France
No Drawing. Filed Aug. 3, 1970, Ser. No. 60,732
Claims priority, application Great Britain, Aug. 8, 1969, 39,893/69
Int. Cl. C07c 101/44
U.S. Cl. 260—471 R
4 Claims

ABSTRACT OF THE DISCLOSURE

Novel normolipemiant agents.
They are constituted by compounds of the formula:

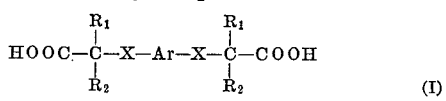

in which X is O or NH, Ar is a monocyclic or bicyclic arylene radical, such as phenylene, biphenylene or naphthylene, $R_1$ is a hydrogen atom or an alkyl radical having 1 or 2 carbon atoms and $R_2$ is an alkyl radical having 1 or 2 carbon atoms and also the ester, amide and nitrile derivatives of such compounds and the non-toxic salts.

---

The invention relates to novel compounds corresponding to the general formula:

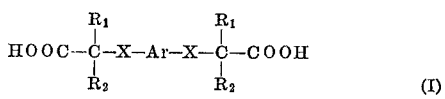

in which X is O or NH, Ar is a monocyclic or bicyclic arylene radical, such as phenylene, biphenylene or naphthylene, $R_1$ is a hydrogen atom or an alkyl radical having 1 or 2 carbon atoms and $R_2$ is an alkyl radical having 1 or 2 carbon atoms and also the ester, amide and nitrile derivatives of such compounds and the non-toxic salts.

The applicants have discovered that compounds corresponding to the above formula in particular have an action on the lipide metabolism and are therefore capable of being utilised as normolipemiant agents, for treating diseases where the causes and symptoms appear to be connected with a distrubance in the metabolism, for example arteriosclerosis and coronary artery disorders.

Pharmaceutical compositions prepared by incorporating one or more of the compounds of the invention in pharmaceutically-acceptable diluents can be administered to patients in a form suitable for providing an immediate or a delayed effect by oral or parenteral administration.

The daily doses proposed for therapeutic usage range from 0.5 to 5 g., depending upon the compound utilised and the method of administration.

Pharmaceutical compositions can also include, in addition to the products of the invention, one or more other medicaments having an action on lipide metabolism or on vascular disorders which is well known, such as vitamins, choline, inositol and amino acids.

The compounds according to the invention can be prepared by condensing a compound, HX—Ar—XH, with two molar equivalents of a halide:

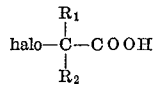

(or a corresponding ester) in a solvent medium, in the presence of potassium carbonate, or in the presence of aqueous caustic soda or in an ethanolic reaction medium, at the boiling point of the reaction medium.

The invention is illustrated by the following non-limitative examples.

EXAMPLE 1

1,5-bis[(1-carbethoxy)-propoxy]-naphthalene

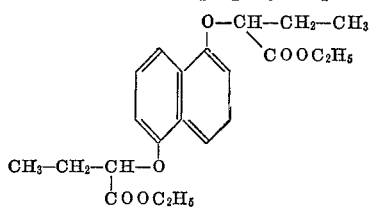

16 g. (0.10 mole) of 1,5-dihydroxy-naphthalene, 39 g. (0.20 mole) of ethyl 2-bromo-butyrate, 30.4 g. (0.22 mole) of potassium carbonate and 200 ml. of acetone were introduced successively into a 500 ml. flask. The reaction mixture was heated and maintained at the boiling point for approximately 7 hours. After cooling, it was taken up in water and ethyl ether.

The ethereal solution was washed with a 10% aqueous caustic soda solution and then with water until it was approximately neutral and then dried over anhydrous sodium sulphate, filtered and evaporated. The crude 1,5-bis[(1-carbethoxy)-propoxy]-naphthalene thus isolated was then purified by crystallisation from methanol.

The product, obtained in a yield of 27.4% (10.6 g.), has the form of a yellow crystalline powder having an instantaneous melting point of 95°–96° C. and is soluble in ethyl ether and in benzene and insoluble in water and in ethanol.

EXAMPLE 2

4,4'-bis[(1-carboxy)-propoxy]-biphenyl

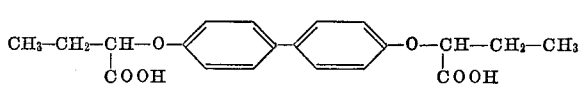

18.6 g. (0.10 mole) of 4,4'-dihydroxy-biphenyl, 39 g. (0.20 mole) of ethyl 2-bromo-butyrate, 30.4 g. (0.22 mole) of potassium carbonate and 200 ml. of acetone were introduced into a 500 ml. flask. The reaction mixture was heated and maintained at the boiling point for approximately 8 hours. After cooling, the mixture was taken up in water and extracted with ether. The ethereal solution was washed with a 5% aqueous caustic soda solution and then with water until it was neutral, dried over anhydrous sodium sulphate, filtered and then evaporated.

30.6 g. of a clear yellow oil was obtained which was saponified by boiling under reflux for three hours with dilute caustic soda in an ethanol/water mixture. After evaporation of the solvent, the thick gummy residue was taken up in water. The aqueous solution, after treating with vegetable charcoal, was then filtered and acidified by the addition of dilute hydrochloric acid. After leaving overnight in an ice bath, the resultant 4,4'-bis[(1-carboxy)-propoxy]-biphenyl which precipitated was isolated by filtration and dried.

The product, obtained in a yield of 6403% (23 g.), has the form of a white powder having an instantaneous melting point of 179°–180° C., and is soluble in dilute aqueous caustic soda solution and in ethanol and is insoluble in ethyl ether and in benzene.

EXAMPLE 3

N,N'-di(1-carboxy-ethyl)-paraphenylene-diamine

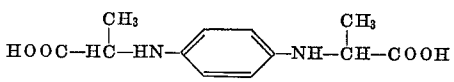

29 g. (0.19 mole) of 2-bromo-propionic acid, 50 ml. of water and then a solution of 8.25 g. (0.21 mole) of caustic soda in 10 ml. of water were introduced into a 250 ml. flask. Then 10 g. (0.09 mole) of paraphenylene-diamine was added. The mixture was taken to boiling for 5 minutes. After cooling, the N,N'-di(1-carboxy-ethyl)-paraphenylene-diamine so formed crystallised. It was recovered by filtration.

The product, obtained in a yield of 8.25% (19.2 g.), had the appearance of a yellowish-grey powder which blackened on exposure to light, having an instantaneous melting point of approximately 200° C., which was soluble in aqueous acid or alkaline solutions and insoluble in water, ethanol, ethyl ether and benzene.

EXAMPLE 4

(Paraphenylene-diamine)-di-ethyl-di-isobutyrate

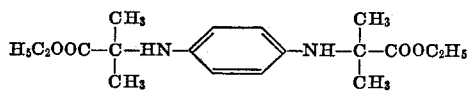

46.25 g. (0.42 mole) of paraphenylene-diamine and 250 ml. of ethanol were introduced into a 500 ml. flask. The mixture was agitated and taken to the boiling point. Then 83.6 g. (0.42 mole) of ethyl bromo-isobutyrate was slowly added. The mixture was cooled, filtered and the solvent evaporated under reduced pressure. The residue was taken up in water acidified by hydrochloric acid. This solution was washed in ethyl ether and then rendered alkaline by the addition of caustic soda and extracted with ethyl ether. The ethereal solution was washed with water, dried over anhydrous sodium sulphate and then filtered and evaporated. The residue, constituted by crude ethyl (paraphenylene-diamine)-di-isobutyrate, was taken up in petroleum ether and then filtered.

The product, obtained in a yield of 40.5% (29.1 g.), has the appearance of a brown powder having an instantaneous melting point of 48°–50° C. and was soluble in ethanol, ethyl ether, benzene and aqueous acidic solutions and insoluble in water.

EXAMPLE 5

N,N'-di[(1-carbethoxy)-propyl]-paraphenylene-diamine

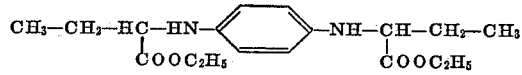

A suspension of 43.2 g. (0.40 mole) of paraphenylene-diamine in 250 ml. of ethanol was taken to the boiling point in a 500 ml. flask. To the clear red solution obtained, 78 g. (0.4 mole) of ethyl 2-bromo-butyrate was added. Boiling was continued for approximately 3 hours. After cooling, the reaction mixture was filtered and the solution evaporated under reduced pressure. The residue was taken up in water and extracted with ethyl ether. The ethereal solution was washed with water, dried over anhydrous sodium sulphate, filtered and then evaporated. The crude N,N'-[(1-carbethoxy)-propyl]-paraphenylene-diamine so recovered was purified by crystallisation from ethanol.

The product, obtained in a yield of 40.5% (13.6 g.), had the appearance of a clear beige powder, the instantaneous melting point of which was 75° C., and it is soluble in aqueous acid solutions, ethanol and benzene, relatively soluble in ethyl ether and insoluble in water.

I claim:

1. A compound of the formula:

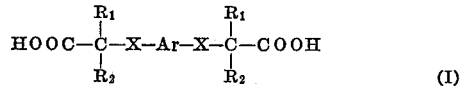

in which X is NH, Ar is a monocyclic or bicyclic arylene radical, $R_1$ is hydrogen or alkyl of 1 or 2 carbon atoms and $R_2$ is alkyl of 1 or 2 carbon atoms, and the alkyl ester of 1 to 2 carbon atoms and non-toxic salts thereof.

2. N,N'-di(1-carboxy-ethyl)-paraphenylene-diamine.
3. (Paraphenylene-diamine)-diethyl-di-isobutyrate.
4. N,N - di-[(1-carbethoxy-propyl]-paraphenylene-diamine.

References Cited

Fieser, L. F., et al.: Organic Chemistry (1956), 3rd edition, pub. by Reinhold Pub. Corp., New York (QD257F5), pages 608–09 relied on.

LORRAINE A. WEINBERGER, Primary Examiner

L. A. THAXTON, Assistant Examiner

U.S. Cl. X.R.

260—465E, 465 F, 473 G, 518 R, 520, 521 R, 559 D; 424—308, 309, 317, 319

PO-1050
(5/69)

UNITED STATES PATENT OFFICE
CERTIFICATE OF CORRECTION

Patent No. 3,686,271     Dated   August 22, 1972

Inventor(s)   Louis Lafon

It is certified that error appears in the above-identified patent and that said Letters Patent are hereby corrected as shown below:

In the name of the inventor  -  change "Louis Lefon" to

-- Louis Lafon --

Signed and sealed this 26th day of December 1972.

(SEAL)
Attest:

EDWARD M. FLETCHER, JR.
Attesting Officer

ROBERT GOTTSCHALK
Commissioner of Patents